May 27, 1924.
H. R. McCONNELL
CHUCK
Filed Sept. 19, 1922
1,495,233
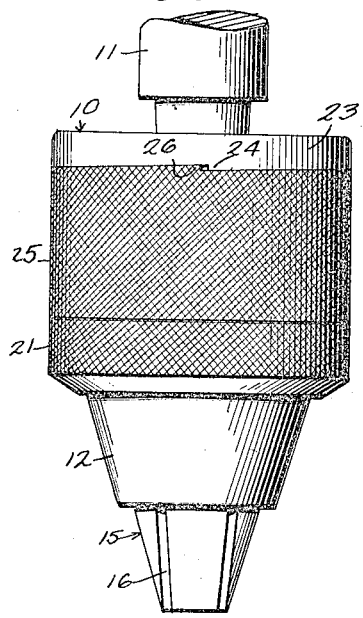
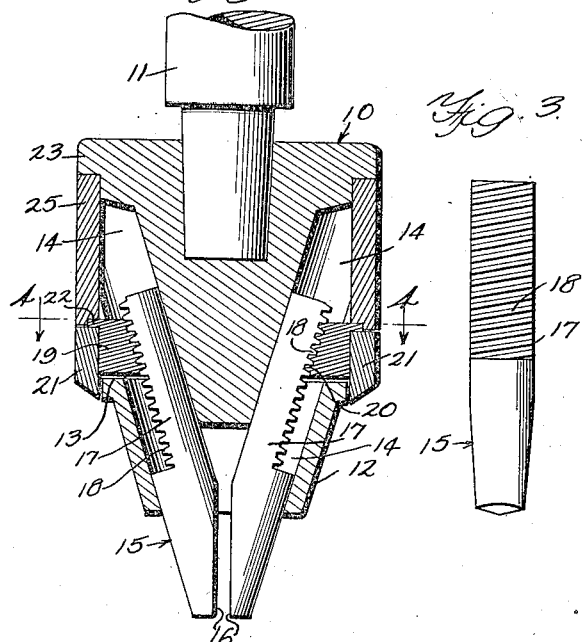
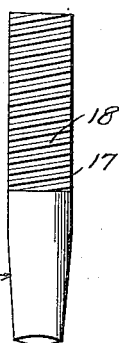
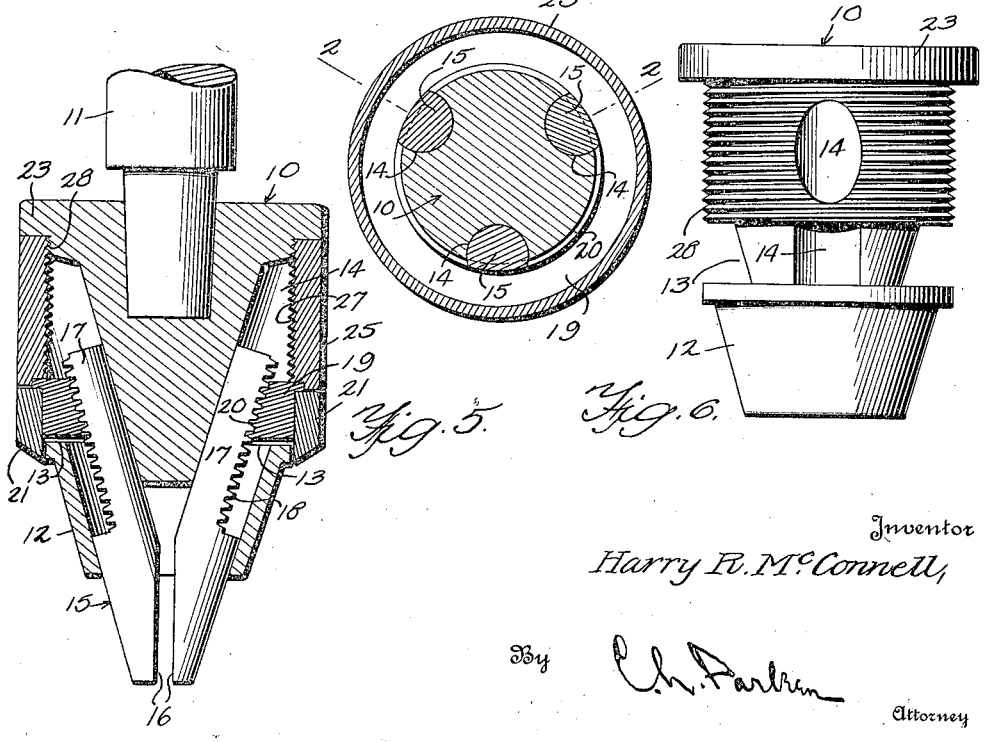
Inventor
Harry R. McConnell,
By
Attorney Patented May 27, 1924.

1,495,233

UNITED STATES PATENT OFFICE.

HARRY R. McCONNELL, OF RICHMOND, VIRGINIA, ASSIGNOR TO THE McCONNELL-BROWNING ENGINEERING COMPANY, OF RICHMOND, VIRGINIA, A CORPORATION OF VIRGINIA.

CHUCK.

Application filed September 19, 1922. Serial No. 589,188.

*To all whom it may concern:*

Be it known that I, HARRY R. McCONNELL, a citizen of the United States, residing at Richmond, in the county of Henrico and State of Virginia, have invented certain new and useful Improvements in Chucks, of which the following is a specification.

This invention relates to chucks and more particularly to such a device employing a plurality of gripping elements adapted to be readily moved into engagement with a tool, means being provided for tightly engaging the gripping elements about the tool.

At the present time a large number of chucks in general use employ a plurality of slidably mounted angularly arranged gripping elements having means adapted for threaded engagement therewith for projecting them downwardly and inwardly into engagement with the shank of a drill or other tool. The means for moving the gripping elements is usually provided with high pitch threads whereby a relatively quick gripping action may be obtained. With the use of such high pitch threads the gripping action is not wholly satisfactory, the gripping element often becoming loose during the operation of the machine upon which the chuck is employed.

An important object of the present invention is the provision of means for rapidly moving the gripping elements into relatively loose engagement with the shank of the tool, further means being provided for causing the gripping elements to tightly grip the tool during its operation.

Other objects and advantages of the invention will be apparent during the course of the following description.

In the drawings I have shown several embodiments of the invention. In this showing, Figure 1 is a side elevation of a chuck embodying the invention, Figure 2 is a longitudinal sectional view of the same taken substantially on line 2—2 of Figure 4, Figure 3 is a detail view of one of the gripping elements, Figure 4 is a section on line 4—4 of Figure 2, Figure 5 is a view similar to Figure 2 showing a modified form of the device, and, Figure 6 is a side elevation of the body portion of the device shown in Figure 5.

Referring to Figures 1 to 4 inclusive the numeral 10 designates the body portion of a chuck mounted upon a spindle 11 connected with a drill press or other machine. The body portion has a lower conical end 12 and is provided intermediate its ends with an annular groove 13, as shown. The body portion is provided with a plurality of downwardly converging openings 14 in which are mounted a plurality of gripping elements designated as a whole by the reference numeral 15. The lower ends of the gripping elements 15 are provided with gripping surfaces 16 adapted to be clamped about the shank of a drill or other tool. The upper ends of the members 15 are reduced as shown at 17 and the outer faces of the reduced portions are provided with threads 18 of relatively high pitch as clearly shown in Figure 3.

A split ring 19 is mounted in the groove 13 and is provided with a substantially conical central opening having threads 20 formed therein. As shown in Figure 2, the threads 20 are adapted to engage with the threads 18 of the gripping elements 15. A sleeve 21 is mounted upon the ring 19 and preferably has a driving fit therewith, whereby rotation of the sleeve will cause rotation of the ring 19. The ring 19 is provided at its upper end with an annular shoulder or extension 22 for a purpose to be described.

The upper end of the body portion 10 is provided with an outstanding annular shoulder 23 having a cam 24 formed upon its lower face. A rotatable sleeve 25 surrounds the body portion 10 between the shoulders 22 and 23. The sleeve 25 is provided at its upper end with a cam 26 adapted to engage with the cam 24 on the shoulder 23. As shown in Figure 1, the faces of the cams 24 and 26 are formed on a relatively low pitch whereby a relatively short downward movement of the sleeve 25 will be caused when it is rotated through a substantial distance. As shown in Figure 2, the ring 19 is of somewhat less width than that of the groove 13 whereby it may partake of limited downward movement upon rotation of the sleeve 25.

In Figures 5 and 6 of the drawings I have shown a somewhat modified form of the device. In this form the arrangement of the body portion, the gripping elements and the ring 19 and sleeve 21, with respect to each other, is the same as that shown in Figures 1 to 4 inclusive. In the modified form however, the sleeve 25 is provided with internal threads 27 engaging threads 28 formed upon the body portion of the chuck. As shown in Figure 6, these threads are of relatively low pitch so as to secure the same relatively slow downward movement of the sleeve 25, when it is rotated, as that obtained in the form shown in Figures 1 to 4 inclusive.

The operation of the device is as follows:

In the form of the device shown in Figures 1 to 4 inclusive, the shank of a tool is inserted between the gripping members 15 when they are in their upper and outer positions. The sleeve 21 may then be rotated by hand to move the gripping members into relatively loose engagement with the shank of the tool. When the portions 16 of the member 15 engage the tool, a slight further rotating movement of the sleeve 21 causes the shoulder 22 to move upwardly into engagement with the lower end of the sleeve 25 as shown in Figure 2. When this movement has been accomplished, a slight space will be left open between the lower face of the ring 19 and the lower face of the groove 13. A wrench may then be applied to the sleeve 25 when the latter is in the position shown in Figure 1, to rotate it with the cam 26 bearing against the cam 24. Rotating movement of the sleeve 25 causes it to move downwardly relatively slowly, the lower end of the sleeve engaging the shoulder 22 to move the ring 19 and gripping members 15 downwardly. The high pitch of the threads 18 and 20 permits the gripping elements to be rapidly brought into relatively loose contact with the shank of the tool. The low pitch of the cams 24 and 26 provides for a tight gripping action of the members 15 about the shank of the tool whereby the latter is held tightly during the operation of the chuck. The operation of the form of device shown in Figures 5 and 6 is the same as that just described, the threads 27 and 28 functioning in the same manner as the cams 24 and 26.

It is to be understood that the forms of my invention herein shown and described are to be taken as preferred examples of the same, and that various changes in the shape, size, and arrangement of parts may be resorted to without departing from the spirit of the invention or the scope of the subjoined claim.

Having thus described my invention, I claim:

A chuck comprising a body portion provided with a plurality of downwardly converging openings and an annular groove intermediate its ends, a plurality of gripping elements slidably mounted in said openings and provided with relatively high pitched threads, a ring rotatably mounted in and being of less width than said groove, and a rotatable sleeve surrounding said body portion and contacting at its lower end with said ring, said body portion above said sleeve being provided with an overhanging annular shoulder having a relatively low pitched cam formed on its under face, and having its outer face substantially flush with the outer face of said sleeve, said sleeve being provided on its upper end with a cam similar to and engaging said first named cam.

In testimony whereof I affix my signature in presence two witnesses.

HARRY R. McCONNELL.

Witnesses:
  W. E. KING,
  J. E. PARKER.